Patented Mar. 23, 1937

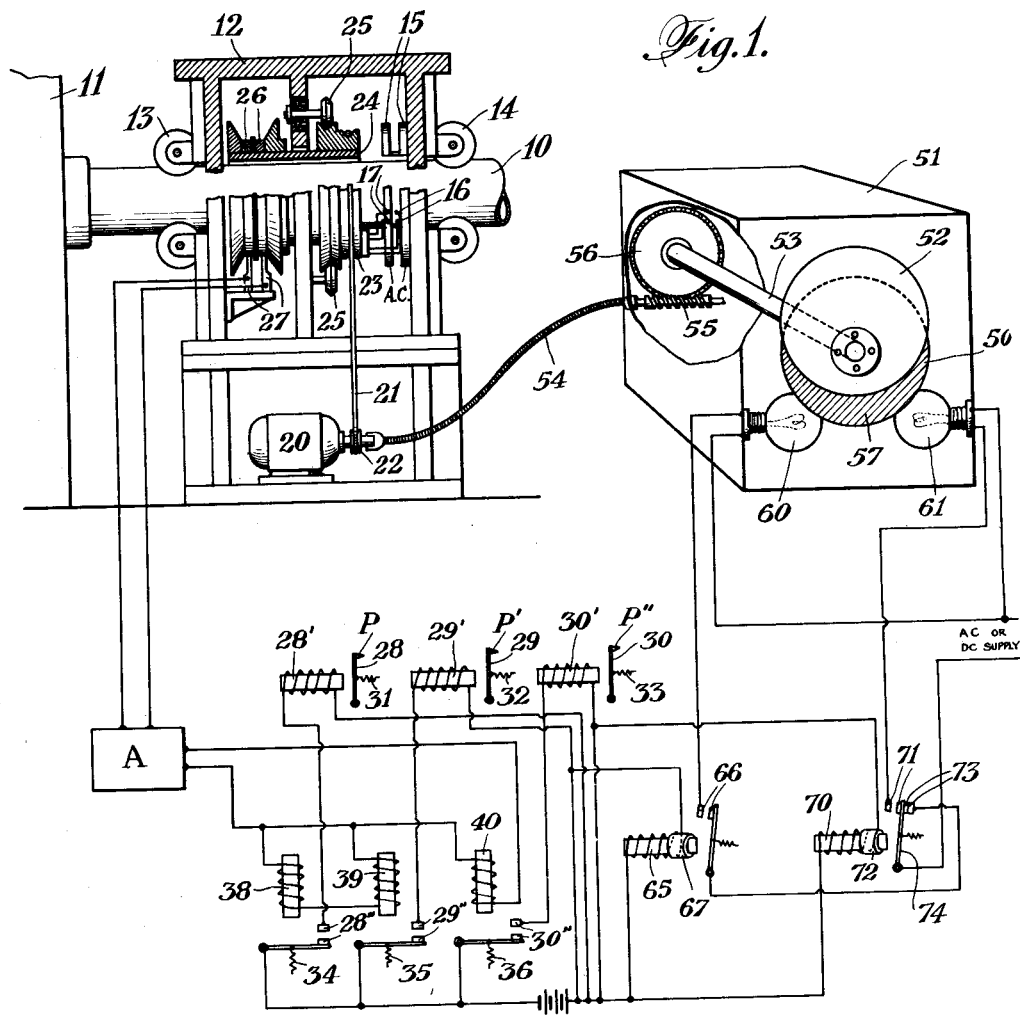

2,074,739

UNITED STATES PATENT OFFICE 2,074,739

INDICATING DEVICE FOR FLAW DETECTOR MECHANISM

Fred D. Braddon, Babylon, N. Y., assignor to Sperry Products, Inc., Brooklyn, N. Y., a corporation of New York Application July 18, 1935, Serial No. 31,969

5 Claims. (Cl. 177—311)

This invention relates to flaw detector mechanism for tubular electrical conductors. More specifically it relates to the Sperry flaw detector mechanism for detecting flaws and eccentricities in the lead sheaths of power cables. Said mechanism is now well known for commercial purposes and consists of a device which responds to flaws and eccentricities in the lead sheath and is caused to make a record by a pen operating on a moving chart to give a permanent indication of the condition of the cable under test.

It is the principal object of this invention to provide in addition to the record heretofore obtained, or in lieu thereof, a visual indication which will not only indicate the presence of defects in the tubular conductor but will also give an indication as to their location on the circumference of the conductor.

It is a further object of this invention to provide visual indicating means as described above which will not only give the location of the defective portion of the tubular conductor but will also give an indication as to the degree or intensity of the defect.

Further objects and advantages of this invention will become apparent in the following detailed description.

In the accompanying drawing,

Fig. 1 is a front elevation partly sectioned vertically and with parts broken away showing an assembly of this invention applied to the Sperry cable testing device together with a wiring diagram of the mechanism.

Fig. 2 is a perspective view largely diagrammatic, illustrating the principle of the Sperry cable testing method.

Referring to the drawing, there is illustrated the mechanism constituting the Sperry lead sheath cable testing mechanism for detecting internal fissures and eccentricities in wall thickness in the lead sheaths of cables. The testing is performed on the cable 10 as it passes out of the lead press 11 which forms the lead sheath around the cable. The lead sheath covered cable 10 is then fed axially through the testing machine 12 by way of sets of guide rollers 13 and 14 and in its passage through the machine 12 current is supplied to the lead sheath, as by means of coils 15 supplied from an A. C. source, to send flux through the lead sheath. Sets of spaced contacts 16, 17 are mounted in contact with the lead sheath and are designed to be rotated around the circumference of the sheath continuously by means such as motor 20, driving belt 21, and pulleys 22, 23, the latter being fixed upon a sleeve 24. Said sleeve surrounds the cable 10 and is held in constant relation thereto by means such as fixed guide rollers 25. The coils 15 may be fixedly mounted on the frame of machine 12 while the sets of contacts 16, 17 are caused to rotate with sleeve 24 as by fixing said contacts upon the pulley 23. Since the cable 10 travels axially and the contacts 16 and 17 travel circumferentially, the sets of contacts will trace a spiral path on the surface of the sheath. Any variations in flux in said sheath caused by flaws or eccentricities will cause a variation in the drop of potential between contacts 16 and 17, and such variations may be taken off slip rings 26 by means of brushes 27 and led to an amplifier A. Any variations in potential between contacts 16 and 17 above a predetermined value will cause the output from amplifier A to operate suitable indicating mechanism which has heretofore taken the form of a plurality of pens P, P', P" carried by armatures 28, 29 and 30 which are attracted by electromagnets 28', 29', 30' respectively against the action of retractile springs 31, 32, 33. The circuits through the electromagnets 28', 29', and 30' are controlled by sets of contacts 28", 29", and 30" respectively, said contacts being normally held open by springs 34, 35 and 36 but designed to be closed when the output from amplifier A is sufficient to energize electromagnets 38, 39 and 40 respectively. Said electromagnets are of increasing strength so that an impulse due to a defect of the smallest degree which it is desired to indicate on the chart will energize only magnet 38 to close contacts 28' and operate only pen P, whereas an impulse from amplifier A of greater strength will energize magnets 38 and 39 to operate pens P and P', and a still greater output of amplifier A will energize all three magnets 38, 39 and 40 to actuate pens P, P' and P". Said pens, it will be understood, operate on a continuously moving chart to trace continuous lines, and actuation of one or more pens will cause a jog to be made in each straight line, and the number of pens actuated at any one time thus gives an indication of the degree of flaw or eccentricity which has been encountered by the sets of contacts 16 and 17 in their travel around the surface of the lead sheath.

It is the present object of this invention to provide in addition to the record tape indicator described above, or, if desired, in lieu thereof, a visual indicator which will not only indicate the presence of a defect but will give an indication of the location of that defect on the circumference of the lead sheath. Such visual indicator may take the form shown in Fig. 1 which comprises a ground glass face or indicating panel 50 inserted in one wall of a closed container 51. The indicating panel 50 is circular corresponding to the cross section of the cable. Adjacent said circular, translucent panel 50 there is caused to operate an opaque panel 52 of substantially the same dimension and shape as panel 50 but mounted eccentrically on shaft 53 which shaft has its axis coincident with the center of panel 50. The shaft 53 is adapted to be rotated from motor 20 by any suitable means such as flexible cable 54 and worm gears 55, 56 to cause the eccentric plate 52 to rotate continuously. As the shaft 53 rotates, eccentric plate 52 will cause a crescent 57 of the translucent plate 50 to be visible at all times, the said crescent progressing continuously around the circumference of plate 50 as the plate 52 rotates. It will be understood that either of plates 50 and 52 may be the stationary plate while the other of said plates rotates. The gearing between motor 20 and plate 52 is such that the crescent exposed portion 57 is always in the same position with respect to the circumference of plate 50 as the sets of contacts 16 and 17 are with respect to the circumference of cable 10.

Means are now provided whereby, should the contacts 16 and 17 discover a portion of the lead sheath which has an internal defect or eccentricity, a light source will be rendered effective to the rear of translucent plate 50 so that the exposed crescent 57 becomes luminous. Since the crescent 57 on plate 50 is in synchronism with the sets of contacts 16, 17 on lead sheath 10, the illumination of the said crescent will be an indication of the position of the said defect on the circumference of the lead sheath 10. Not only is the exposed crescent 57 illuminated to indicate the position of defect on the circumference of lead sheath 10, but the type of illumination is controlled so as to give an indication of the degree of the defect. Thus, two sets of sources of illumination may be provided. One may be a yellow lamp 60 and the other a red lamp 61, one of which is designed to be illuminated when the defect is lesser and the other when the defect is greater. Thus, for instance, if the yellow light illuminates crescent 57 it means that a defect equivalent, for example, to a two-pen indication on the record chart has been discovered, while if the red light illuminates crescent 57 it may indicate a defect equivalent to a three-pen indication on the chart.

For operating the sources of illumination as described above, there may be provided the electric circuit arrangements shown in Fig. 1. In this arrangement it will be seen that defects corresponding to operation of only one pen, that is, pen P, on the chart, are disregarded as being within safety limits. When a defect sufficient to operate pens P and P' comes through the amplifier A, then provision is made for lighting the yellow lamp 60. This is accomplished by connecting lamp 60 and electromagnet 65 in parallel with pen magnet 29' so that whenever said pen magnet 29' is energized magnet 65 will also be energized to close a set of contacts 66 to send current from an A. C. or D. C. supply source through the yellow lamp 60. Since the impulse coming through amplifier A in response to a defect is of very short duration, the electromagnet 65 is preferably of the delayed action type, as shown by the copper slug 67, to prolong the energization of lamp 60 sufficiently to permit an operator to obtain a good view of the same.

Similarly, when an impulse comes through amplifier A of sufficient strength to energize pen magnet 30' it will also energize electromagnet 70 in parallel therewith to close a set of contacts 71 and permit current from the A. C. or D. C. supply to illuminate lamp 61. The magnet 70 is also of the delayed action type as shown by the copper slug 72. When the red lamp 61 is illuminated it is, of course, desirable that the yellow lamp 60 be extinguished, and for this reason the circuit through lamp 60 lies through a set of contacts 73, one contact of said set being carried by the armature 74 which carries one contact of the set 71. Thus, when magnet 70 attracts its armature 74 it opens contacts 73 to break the circuit through lamp 60 before closing contacts 71 to illuminate lamp 61.

It will be understood that if the pen and record chart arrangement is discarded and only the visual indicator is employed, then the sets of contacts 29'' and 30'' will control the electromagnets 65 and 70 directly.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector mechanism for tubular conductors, flaw-responsive means, means for causing said flaw-responsive means to travel around the periphery of the conductor under test, an indicator comprising a light-transmitting circular disc, a source of light and an opaque circular disc cooperating with said first disc, one of said discs being rotatably and eccentrically mounted with respect to the other of said discs on a shaft concentric with said stationary discs so that successive portions adjacent the periphery of said light-transmitting disc are uncovered as the rotatable disc rotates, means whereby said light source is rendered effective when said flaw-responsive means encounters a flaw, and means for rotating said rotatable disc in synchronism with said flaw-responsive means.

2. In a flaw detector mechanism for tubular conductors, flaw-responsive means, means for causing said flaw-responsive means to travel around the periphery of the conductor under test, an indicator comprising a stationary light-transmitting circular disc, a source of light and a rotatably mounted opaque circular disc cooperating with said first disc, said opaque disc being eccentrically mounted with respect to said stationary disc on a shaft concentric with said stationary disc so that successive portions of said stationary disc adjacent the periphery thereof are uncovered as the opaque disc rotates, means whereby said light source is rendered effective when said flaw-responsive means encounters a flaw, and means for rotating said opaque disc in synchronism with said flaw-responsive means.

3. In a flaw detector mechanism for tubular conductors, flaw-responsive means, means for causing said flaw-responsive means to travel around the periphery of the conductor under test, an indicator comprising a light-transmitting circular disc, a plurality of distinctive sources of light, and an opaque circular disc cooperating with said first disc, one of said discs being rotatably and eccentrically mounted with respect to the other of said discs on a shaft concentric with said stationary disc so that successive portions adjacent the periphery of said light-transmitting disc are uncovered as the rotatable disc rotates, means whereby said light sources are selectively rendered effective by said flaw-responsive means in accordance with the degree of flaw encountered, and means for rotating said rotatable disc in synchronism with said flaw-responsive means.

4. In a flaw detector mechanism for tubular conductors, flaw-responsive means, means for causing said flaw-responsive means to travel around the periphery of the conductor under test, an indicator comprising a stationary light-transmitting circular disc, a plurality of distinctive sources of light, and a rotatably mounted opaque circular disc cooperating with said first disc, said opaque disc being eccentrically mounted with respect to said stationary disc on a shaft concentric with said stationary disc so that successive portions of said stationary disc are uncovered as the opaque disc rotates, means whereby said light sources are selectively rendered effective by said flaw-responsive means in accordance with the degree of flaw encountered, and means for rotating said opaque disc in synchronism with said flaw-responsive means.

5. In a flaw detector mechanism for tubular conductors, flaw-responsive means, means for causing said flaw responsive means to travel around the periphery of the conductor under test, an electric indicator including a member similar in form to the cross-section of the conductor under test, and a circular shutter, said shutter normally covering all of said member with the exception of a portion near the periphery thereof, means for mounting said shutter so that when rotated it uncovers successive portions of said member adjacent the periphery thereof, means whereby said flaw-responsive means renders said indicator effective when a flaw is encountered, and means for rotating said shutter in synchronism with said flaw-responsive means.

FRED D. BRADDON.